3,372,084
POST-FORMABLE ABSORBENT PAPER
Hanns F. Arledter, Chillicothe, Ohio, assignor to The Mead Corporation, Dayton, Ohio, a corporation of Ohio
No Drawing. Continuation-in-part of application Ser. No. 323,571, Nov. 14, 1963. This application July 18, 1966, Ser. No. 565,688
13 Claims. (Cl. 162—128)

ABSTRACT OF THE DISCLOSURE

This invention relates to post-formable decor and overlay papers for use in plastic laminates, and to the laminates made therefrom. The papers are characterized by use of from 35 to 100% of fine fibers of vegetable or synthetic organic origin having a specific volume of 75–175 cubic microns and an average length over 2 mm. The balance of the fiber portion is paper making wood pulp. The papers contain an acid acceptor such as zinc oxide, calcium carbonate or calcium silicate, and are essentially neutral, as indicated by a pH of water extract in the range of 6.8 to 7.6, with an alkali number of 0.5 to 3.0. The plastic laminates using these papers as decor and/or overlay sheets are post-formable to a radius of ½ inch or less.

---

This is a continuation-in-part of copending application Ser. No. 323,571, filed Nov. 14, 1963, now abandoned.

This invention relates to new and useful improvements in paper manufacture and is directed more particularly to the provision of absorbent papers for the manufacture of high and low pressure plastic laminates with improved postformability characteristics.

A primary object of this invention is to provide structural, chemical and other property improvements in paper of this type, which permit the manufacture of low and high pressure plastic laminates with certain distinct characteristics, uses and advantages in regard to post-formability, deep draw capability, stain resistance of the surface, freedom from surface checking or crazing, and other improvements, all as will presently be set forth.

It is another object of the invention to provide new and improved overlay and decor papers of well defined chemical characteristics and made of fibers of specified characteristics in regard to length, and thickness arranged in a structure yielding plastic laminate having deep draw capability and post-formability.

Absorbent paper for overlay and decorative purposes for laminates heretofore has been manufactured by conventional papermaking methods with non-critical specifications and with little regard to chemistry, pH, and acid or alkali number specifications. Such papers, while eminently acceptable for flat plastic laminates, do not yield laminates having acceptable post-forming or deep drawing properties. Heretofore post-formability of laminates was limited to laminate thicknesses of 0.045 to 0.050 inch, and bend radii of ⅝ inch or higher, and to achieve this limited goal, special post-formable melamine-formaldehyde resins and specific cross-creped corestock inlays were required.

By contrast, absorbent papers of this invention permit the manufacture of post-formable laminates of 0.050 to 0.070 inch thickness, and bend radius of ¼ inch at 90–120° of bend, using regular corestock, and conventional melamine-aldehyde resins. Bend radius as low as ⅛ inch at 60–120 degree bend can be attained with cross-creped corestock layups and post-formable resins used in combination with the decor and overlay papers of this invention.

The absorbent papers and post-formable plastic laminates made therefrom, according to this invention, widen the scope of the laminating industry. The possibilities of post-forming laminates with much sharper bend radii and with higher angular bends of 60–120° permits new design concepts and new overall effects adding to the utility of high and low pressure laminates. New aesthetic and technical design effects are possible at materially reduced cost of the laminate structure.

This invention is not limited to any particular post-formable resin and it is to be understood that any post-formable resins or regular laminating resins known to the trade and developed for the manufacture of regular laminates or post-formable laminates can be used in combination with the papers of this invention. Likewise, this invention is not concerned with any particular corestock laminate layups, and laminates made according to the invention can, therefore, contain regular or creped corestock papers or any other specific inlays or devices which help to further increase the post-formability of the laminate.

The decor and overlay paper according to the invention possess basically all the general properties of regular decor or overlay paper, and, in addition, impart post-formability to plastic laminates produced therefrom. As added benefits, they possess improved stain resistance and have a higher resistance to crazing. This improved stain and craze resistance is observed not only at the post-formed bends, but is manifested on the flat surfaces of the laminates as well. In specific cases, drawing properties are likewise much improved.

To clarify the description which follows, definitions of some of the terms used herein are set forth.

"Decor paper" refers to an opaque absorbent paper, usually colored and/or printed, which is incorporated as a decorative surface layer in a multi-layer plastic laminate. Decor papers are usually saturated or impregnated with melamine-aldehyde thermosetting resins, which are preferred because of their freedom from color. Mineral fillers used in decor papers are selected for opacifying power so as to effectively hide the darker corestock.

"Overlay paper" refers to an absorbent paper which becomes transparent when saturated or impregnated with a resin and incorporated as a top surface sheet (overlying the decor paper) in a plastic laminate. Overlay papers are usually saturated with melamine-aldehyde resins. The function of the overlay paper is to provide a transparent, wear-resistant surface over the decor paper, so that service life in normal usage of a plastic laminate, as in a table top, for example, is increased. Wear sufficient to erode the full thickness of the overlay paper must occur before the printed design of the decor paper is affected.

"Corestock" refers to an assembly of resin saturated or impregnated paper layers built up to give the desired thickness of the final plastic laminate. Corestock assemblies usually comprise the less expensive unbleached papers and relatively highly colored phenol-aldehyde resins. Layers of cross-creped papers may be incorporated in corestock to impart deformability thereto.

"Post-formable" as applied to a plastic laminate refers to the property of a pre-cured laminate to undergo bending (when hot) to relatively simple curves. The greater the angle of bend, and the smaller the radius of bend, the more severe are the post-forming conditions. Plastic laminates which do not possess post-formability will crack or break when subjected to such bending treatments, while those showing post-formability to a small degree exhibit crazing and/or flaking of the surface layers when so treated. The term "post-formable" when applied to decor or overlay papers refers to the ability of such papers to impart post-formability to plastic laminates produced therefrom. Generally, post-formable plastic laminates are first made as flat panels, with resin cure advanced to a point relatively between a B and a C stage, rather than being fully cured to a C stage. At some later time, upon reheating, such laminates may be bent to curved shapes.

"Deep draw capability" refers to the ability of an assembly of resin saturated or impregnated corestock, decor and overlay papers to be drawn to complex shapes in a mold concomitantly with cure of the resin under heat and pressure. Decor and overlay suitable for this application must be capable of significant distortion without rupture.

In very extensive studies, the conditions and requirements for the manufacture of absorbent papers for post-formable plastic laminates have been established. Such an absorbent paper, either opaque decorative absorbent or transparentizing overlay, of optimized post-formability of the kind described above, has to possess a number of basic requirements. Any of these requirements alone do not give acceptable post-formability, and only the proper combination of the following factors yields a decor or overlay paper suitable for post-formable laminates. These elements are: fiber type and geometry, fiber strength, relative freedom from excessive acidity or alkalinity, and storage stability. While interrelated, these elements can be divided into two groups, e.g., physical and chemical. In the following, each element's contribution to post-formability will be pointed out with illustrative supporting data.

PHYSICAL FACTORS

1. Influence of fiber type

Tests have shown conclusively that absorbent papers meeting the complex post-formable, deep draw capability, stain resistant, no crazing requirements can best be produced with fibers which possess a high tenacity and a low fiber diameter or cross section area. Fibers are required which do not embrittle with the resin, which do not cause excessive resin cure or tend to catalyze the resin cure in or around the fibers.

Preferably the fibers for the papers of the invention, are selected from cotton linters, Manila hemp, linen, low denier synthetic fibers of high tenacity like high tenacity viscose rayon, polynosic viscose rayon, acrylic or polyamide (nylon). For economic reasons, cotton linters alone or in combination with rag fibers are preferred. With increasing amounts of such fibers in the paper, the post-formability of the laminates increases. In contrast, wood pulp fibers generally show poor post-formability characteristics as compared to the low denier high tenacity vegetable fibers.

2. Fiber diameter

While reference has been made to fiber diameter, it is understood that many, if not most, fibers do not have circular cross sections, but may have a flattened ribbon-like cross section or an irregular shape. As used herein, the term "diameter" means the diameter of a circle which would have the same area as the cross section of the fiber. Fiber cross sections are more realistically described as "specific volume," which term is defined as the volume of a unit length of the fiber.

With increasing fiber specific volume, the post-formability of the laminates decreases as does the stain resistance, while the crazing tendency increases.

Set forth below is a comparison of fiber dimensions for various wood, vegetable and synthetic fibers.

|  | Fiber Width, Microns | Fiber Thickness, Microns | Specific Fiber Volume (Assuming Rectangular Shape) [1] cubic microns |
|---|---|---|---|
| Vegetable Fibers: |  |  |  |
| Cotton Linters | 14-20 | 5-10 | 75-110 |
| Linen | 12 | 6 | 75 |
| Manila (Abaca) | 17 | 9-6 | 75-170 |
| Mitsumata | 13 | 6 | 75 |
| Sisal | 16 | 10 | 160 |
| Wood Fibers: |  |  |  |
| Softwood Paper Grade Alpha | 26 | 8 | 210 |
| Scandinavian Softwood Bleached Sulfite | 29 | 7 | 200 |
| Hemlock Kraft | 31 | 13 | 405 |
| Southern Pine | 40 | 13 | 520 |
| Synthetic Fibers: |  |  |  |
| Viscose Rayon 1.5 den | 11.5 |  | 110 |
| Nylon 1 den | 11.2 |  | 100 |

[1] Per unit length of fiber.

It will be noted that as a class, the wood fibers are definitely coarser than either the vegetable fibers or the fine synthetic fibers, the wood fibers having a specific volume generally in excess of 200 cubic microns, while the others range from about 75 to about 175 cubic microns.

3. Fiber strength

Using substantially equal fiber dimensions, a paper containing low tenacity viscose rayon does not post-form as well as a similar paper containing nylon or cotton linters. The tensile strength of the fibers (which may be expressed as tenacity, loop strength, or some measure of stress-strain characteristics) is an important contributing factor to post-formability of plastic laminates. The following gives representative values for tensile strength and tenacity of fibers.

|  | Average Tensile Strength, p.s.i. | Breaking Tenacity |
|---|---|---|
| Wood Fibers | 40,000-80,000 | 2-4 |
| Regular Viscose Rayon | 38,000 | 1.5-2.4 |
| Cotton | 80,000 | 3-5 |
| Nylon | 80,000 | 5-6 |

A paper containing 5-15% of nylon fibers exhibited better deep drawing and post-formability characteristics of plastic laminates prepared therefrom than a paper containing the same amount of viscose rayon fibers of the same length and thickness.

Likewise, fibers which embrittle the least when subjected to resin-curing conditions in the presence of a resin will yield laminates of improved post-forming characteristics.

4. Fiber length

One of the most important factors influencing deep draw capability and post-formability of plastic laminates is the fiber length used in the decor and overlay papers. With increasing fiber length of cotton linters or other fibers (other factors being equal), the post-formability improves. Of course, with increasing fiber length, formation also decreases and maximum fiber length is therefore limited. In this regard, ½ inch nylon fibers yield better deep drawing properties than ¼ inch nylon fibers.

How the fiber length influences statistical failure in post-forming of laminates can be concluded from the following data.

CLARK FIBER CLASSIFICATION OF COTTON LINTER PULP

| Percent Retained On— | Sample | | | | |
|---|---|---|---|---|---|
|  | A | B | C | D | E |
| Screen: |  |  |  |  |  |
| 14 mesh | 1 | 9 | 16 | 28 | 36 |
| 30 mesh | 26 | 36 | 38 | 36 | 28 |
| 50 mesh | 26 | 24 | 25 | 20 | 15 |
| 100 mesh | 27 | 22 | 19— | 15 | 12 |
| Statistical Post-Formability | Poor | Fair | Good | Exc. | Exc. |
| Statistical Percent Failure (under severe conditions) | 30 | 15 | ([1]) | None | None |

[1] Very few.

From this it is seen that the higher the fraction retained on the 14-mesh screen, the better the post-forming properties. The Clark Classifier is a useful and convenient method for approximating the fiber length distribution of paper-making pulp. The higher the screen mesh, the shorter the fibers which will pass through the screen.

For example, the fiber length of cotton linter pulps D and E was measured microscopically with the following

| Fiber length | Percent Fibers in Sample (By Number) | |
|---|---|---|
|  | Sample D | Sample E |
| 4.5–6 mm. or over | 3.5 | 6 |
| 3.75–4.5 mm | 3.5 | 9 |
| 3–3.75 mm | 14.0 | 19 |
| 2.25–3.0 mm | 31 | 31 |
| 1.5–2.25 mm | 33 | 25 |
| Less than 1.5 mm | 15 | 10 |
| Average Fiber Length, mm | 2.4 | 3.2 |

Papers made of an average fiber length of below 1–1.2 mm. yield poor post-formability; at 1.5–2.0 mm. average fiber length, fair to good post-formability; at 2 mm. or higher average fiber length, good to excellent post-formability. The fiber length distribution, particularly the percentage of fibers of 2.5–5 mm. length is also of importance. The average fiber length can be reduced provided there is a significant proportion (for example 10–20%) of long fibers of 4–10 mm. length present in the papermaking stock. For instance part of the fibers (75–90%) such as cotton linters can be long and of high freeness (650 C.F.) while the remainder of the fibers, such as rag (10–25%) can be beaten to a shorter length and be of lower freeness (300 C.F.). The upper limit on average fiber length is imposed by the capabilities of the particular paper machine on which the paper is produced, and some machines can be operated with fibers as long as one inch or more and still produce acceptable formation.

5. Fiber geometry as related to paper geometry

To fully understand the importance of fiber dimensions in the manufacture of post-formable absorbent papers theoretical calculations, presented below, indicate structural differences within a paper in relation to fiber thickness and width, or diameter. The finer fibers provide a significantly greater number of crossing points and fiber layers for a given paper thickness and indicates why cotton linters alone or in combination with rag fibers are a preferred embodiment.

THEORETICAL FIBER GEOMETRY COMPARISON BETWEEN RAYONS, COTTON LINTERS AND WOOD FIBERS IN OVERLAY PAPER

| Fiber Kind | Viscose Rayon, 0.75 den. | Viscose Rayon, 1.5 den. | Cotton Linters (Non-fibrillated) | Wood Fibers (Non-fibrillated) |
|---|---|---|---|---|
| Theoretical No. of fibers (1 cm.) per cm.$^2$ of paper | 7,600 | 3,800 | 4,100 | 1,500 |
| Spec. External Surface Area | 25 | 16.7 | 12.3 | 6–10.5 |
| Theoretical No. of Crossing Points | 4×10$^7$ | 1×10$^7$ | 2×10$^7$ | 5–10×10$^5$ |
| Theoretical No. of Uncompressed Fiber Layers in Paper | 16 | 8 | 8–12.5 | 4–65 |

It has been found that with increasing numbers of fiber-to-fiber bonds within the paper structure, deep draw capabilities or post-formability characteristics decrease. The general rule for post-formability is therefore the less H-bonding (or chemical or irreversible fiber-to-fiber bonding), the better. The resin then will deposit between and around the fibers. The paper thus possesses a softening high stretch and bulks with the resin. As the number of H-bonds between fibers increases, paper strength as measured by tensile or burst increases, and post-formability decreases, as shown below:

| Paper Sample | A | B | C |
|---|---|---|---|
| Tensile Strength, gm./in | 15,000 | 10,000 | 8,000 |
| Burst, p.s.i. | 48 | 19 | 12 |
| Post-Formability | (¹) | (²) | (³) |

¹ Generally Limited.
² Good.
³ Very good.

It is apparent from this data why thinner and longer fibers are preferred. With increasing fiber length and increasing number of fibers (decreasing fiber specific volume), the tear, stretch, trapezoidal tear and edge tear increase. Such a paper can be readily processed in resin saturating operations even at relatively low tensile and wet tensile strength. Greater numbers of long thin fibers, in combination with shorter and fibrillated fibers (rag), yield paper of good handling strength because of the friction forces generated between the fibers and the increased number of fiber-to-fiber crossing points. Theoretically, no particular H-bonding is required at these crossing points in order to insure adequate strength for processing and good post-formability characteristics. In contrast, it has been found that with increasing wet strength of the paper or with increasing quantities of wet strength resin in the paper, the post-formability decreases as shown in the following data.

| Sample Designation | A | B | C | D |
|---|---|---|---|---|
| Wet Strength Resin Content, Percent | 1.5 | 1.0 | 0.5 | 0.30 |
| Wet Strength Tensile, gm./in | 2,500 | 1,200 | 800 | 500 |
| Post-Formability | (¹) | (²) | (³) | (⁴) |

¹ Fair to Poor.
² Good.
³ Good to Very Good.
⁴ Very Good.

This again indicates the desirability of having a minimum of bonding between fibers, and dependence on an increased number of fiber crossing points to provide a paper with the handling characteristics required in the resin saturating operation.

The paper with the best post-formable characteristics has a structure in which the fibers do not adhere excessively to each other, and separate, to a degree, in the presence of the resin in the paper so that the paper structure is deformable and can stretch when stress is applied during the post-forming of the laminates at temperatures of, for instance 300–320 degrees F. Excessive fiber-to-fiber bonding does not permit stretching of the paper-resin structure and stress builds up until the rupture strength is exceeded (especially in the case of short fiber length or at low fiber tenacity) and failure at the point of maximum stress is the result.

FIBER GEOMETRY OF AN 28# (24 x 36-500) OVERLAY PAPER 5 MIL THICKNESS (d=0.36) FOR RIBBON FIBERS

| | | | | | |
|---|---|---|---|---|---|
| Fiber Thickness 10$^{-4}$ cm | 5 | 5 | 5 | 10 | 10 |
| Fiber Width 10$^{-4}$ cm | 15 | 25 | 35 | 30 | 40 |
| Fiber Specific Volume (L=1 cm.) V cm.$^3$ | 7.5×10$^{-7}$ | 1.25×10$^{-6}$ | 1.75×10$^{-6}$ | 3×10$^{-6}$ | 4×10$^{-6}$ |
| Fiber Specific Surface (L$_2$=1 cm.) cm.$^2$ | 3×10$^{-3}$ | 5×10$^{-3}$ | 7×10$^{-3}$ | 6×10$^{-3}$ | 8×10$^{-3}$ |
| External Fiber Surface Area per gr. of fibers (d=1.5) | 2.70×10$^3$ | 2.70×10$^3$ | 2.70×10$^3$ | 1.32×10$^3$ | 1.32×10$^3$ |
| Theor. No. of fibers 1 cm. Length in 1 cm.$^3$ | 8.8×10$^5$ | 5.3×10$^5$ | 3.8×10$^5$ | 2.2×10$^5$ | 1.66×10$^5$ |
| Theor. No. of fibers (1 cm.) in 1 cm.$^2$ Overlay paper | 4,100 | 2,450 | 1,770 | 1,020 | 720 |
| Theor. No. of Crossing Points per cm.$^2$ paper (Packing Density 0.25) | 1.68×10$^7$ | 6×10$^6$ | 3.2×10$^6$ | 1.04×10$^6$ | 5.2×10$^5$ |
| Fiber-Fiber Contact Area in Overlay paper cm.$^2$ | 38 | 38 | 38 | 9.4 | 8.3 |

6. Factors influencing the crazing tendency of the post-formable laminate

Fiber diameter and number of fibers per unit volume are important not only to obtain strength for handling at low levels of fiber-to-fiber bonding, but is also important in decreasing the crazing tendency and/or staining tendency of the laminate surface. With an increasing number of fibers per unit volume at equal fiber weight and resin content, the crazing and staining tendencies of the laminate surface decrease. For instance, a paper made of cotton linter fibers crazes the least, while a comparable paper made of larger diameter wood pulp fibers crazes severely. Three-denier viscose rayon fibers craze severely, while 0.75 denier viscose rayon fibers are relatively free from this defect.

Melamine formaldehyde resins which are not reinforced with fibers and/or paper show a severe crazing tendency. The more fibers available, the less the crazing, resin content being equal. Fine fibers, such as cotton linters are therefore a prerequisite, at least in the surface layers of a post-formable laminate. The tendency to craze can be greatly reduced by adding cotton linters or other fine fibers as a surface layer of double layer paper by means of a secondary headbox.

CHEMICAL FACTORS

The chemical condition of the post-formable paper and the chemical history of the fibers employed in its preparation are of considerable importance for the production of post-formable laminates. A neutral or slightly alkaline paper yields best post-formability, when combined with the melamine-formaldehyde resins normally employed for making plastic laminates. The data which follow illustrate the effect of pH of water extract, acid number, and alkali number on post-formability.

| | Sample | | |
|---|---|---|---|
| | A | B | C |
| pH of Water Extract | 5.8–6.6 | 6.8–7.6 | 7.8–8.3 |
| Acid No. (ml. 0.01 N NaOH) | 0.5–1.0 | | |
| Alkali No. (ml. 0.01 N HCl) | | 0.5–3.0 | 5–7.7 |
| Post-Formability (Statistical Ave.) | (¹) | (²) | (³) |

¹ Fair to Poor.
² Very Good.
³ Fair.

The pH of water extract is determined according to TAPPI Standard Method T435 m-52. This method provides for extraction of a sample of the paper with either hot or cold distilled water, followed by measurement of the pH of the resulting water extract. While acid-reacting papers yield different pH values for hot as compared to cold water extraction, little or no difference is observed with papers which are substantially neutral. Values for pH of water extract reported herein have been based on extraction with hot water at 95 to 100° C.

As used herein, acid numbers and alkali numbers are expressed as ml. of 0.01 N sodium hydroxide or ml. of 0.01 N hydrochloric acid required to neutralize the water extract resulting from treatment of a 5 gram sample of paper with 250 ml. of boiling distilled water. Except for the reporting of results, the method is that of TAPPI Standard Method T428 m-45.

It is known that acidity or alkalinity will catalyze the melamine-formaldehyde resin curing reaction. At either high or low pH, the resin cures more rapidly to a C stage and can no longer be post-formed. Under such acid or alkaline conditions, the resin cross-links to a significantly higher degree during the pre-cure before the post-forming operations especially at the fiber surface, and this impairs post-formability. For best results, pH of the post-formable paper, as measured by the water extract, should lie in the range of 6.8–7.6, with an alkali number ranging from 0.5–3.0.

It is essential to control curing of the resin in the paper and specifically to prevent excessive cure of those portions of the resin in contact with the fibers. Fibers containing extraneous chemicals, e.g., acids, salts, or the like, which can catalyze the resin cure should be avoided. Alkali treated fibers are preferred and to remove acid residues from the fibers, the stock is processed prior to formation at a pH in excess of 8.0 for acid neutralization within the fiber structure. The chemistry of cellulosic fibers and paper is very complex, and temperature and time can change the pH of water extract and the acid or alkali number. To keep the paper of this invention at the desired controlled pH of water extract and alkali number, acid acceptors such as zinc oxide, calcium carbonate or calcium silicate are added to the paper during its production.

Acid acceptors help to stabilize the paper during its shelf life and processing steps. Most post-formable paper grades post-form without the addition of acid acceptors, providing they are used shortly after paper manufacture, but papers made without the addition of acid acceptors show a higher degree of failure, if used after prolonged storage. No failures have been observed with papers containing acid acceptors.

In a series of trials the influence of long, precut synthetic fibers on the post-formability of decor paper was studied and it was found that such fibers, in addition to post-formability, also improve deep draw capability of decor papers. Nylon, Orlon, acrylic fibers (Verel, Darlan and Dacron), and the like, in amounts of 2.5, 5, 10 and 15% were employed with 1.5, 3, 5 and 15 denier. As little as 5% nylon or 3 or 1.5 denier materially improves the deep draw capability and post-forming characteristics of regular decor paper, while 10–15% of fibers of ¼ in. to ½ in. length result in very good post-formability and deep draw capability. Only high tenacity synthetic fibers which do not shrink, can be used effectively, and nylon and Dacron are preferred. The following data illustrates these factors.

| Sample | Percent Synthetic 3 den. Fibers Added | Fiber Length In Inches | Deep-draw Capability Rating |
|---|---|---|---|
| A | 0 | | Very poor. |
| B | 5 | ¼ | Fair. |
| C | 10 | ¼ | Good. |
| D | 15 | ¼ | Very good. |
| E | 5 | ½ | Good. |

To determine the deep draw capability of the paper of this invention, a Y-shaped press form was employed, which involves complex extensibility of samples molded thereon. The paper was treated with a 50% melamine-formaldehyde solution to a resin content of 45–50%, based on total weight of paper and resin. The paper was then precured for 3–5 minutes until the volatile content reached 3–6%, with a flow of approximately 3–8%. The paper sample was next pressed for 15 minutes at 20,000 lb. pressure in the Y-shaped press form. The following test results show the influence of fiber denier on printability and crazing tendency.

| Synthetic Fiber Denier | Printability | Crazing Tendency |
|---|---|---|
| Nylon 1½ den | Good | None. |
| Nylon 3 den | do | Fair, light or more. |
| Nylon 5.5 den | Some Fiber Show | Strong. |
| Nylon 15 den | Strong Fiber Show | Do. |

The addition of 5–20% of 1–2 denier precut synthetic fibers of ¼ to ½ in. length, of the nature described above is the preferred embodiment for post-formable decor paper which in addition has acceptable deep draw capability.

All of the fibers yielding good post-formability in papers according to this invention are more expensive than regular cellulosic wood pulp such as alpha, sulphite, or sulfate. In studies to improve the economy of manufacture of post-formable decor papers, papers were prepared using all the prerequisites for post-formability, but by adding varying amounts of wood pulp to the furnish. The following data show the influence of the wood pulp additions on post-formability.

POST-FORMABILITY OF DECOR PAPER CONTAINING VARYING AMOUNTS OF WOOD PULP
(Bend Radius)

| Cotton linter content, percent | 100 | 75 | 45 | 35 | 0 |
|---|---|---|---|---|---|
| Wood pulp content | 0 | 25 | 55 | 65 | 100 |
| 60 mil laminate, inch | ¼–½ | ¼–½ | ⅝ | (¹) | (¹) |
| 47 mil laminate, inch | ½ | ¼ | ⅝ | ¾ | ⅞ |

¹ Failed.

The laminates above were prepared and post-formed by the standard method. It can be seen that for less rigid requirements of bend radius and lower laminate thickness, the cotton linter content can be reduced to 35% and still provide acceptable levels of post-formability.

In studies with composite papers, the post-formability and other wanted properties of post-formable papers have been attained at reduced cost. In a double-layer paper the total long-fibered cotton linter content can be reduced to 35% or less with substantially the same post-formability as a 100% cotton linter paper.

A double-layer decor paper was made, consisting of a primary layer of 65 lb. (24 x 36-500) of a regular wood pulp surfaced with a secondary 35 lb. layer of 100% long-fibered cotton linters both layers containing opacifying mineral fillers. The total paper consisted of a base layer of inexpensive wood pulp, with a top layer of cotton linters, the wood pulp amounting to 50% and the cotton linters amounting to 30% of the total weight, the balance being mineral fillers. This paper was used to prepare a 50 mil thick post-formable plastic laminate with the cotton linter layer on the outside or top surface. The laminate could be post-formed to ⅛"–¼" radius bends at 120 degree angles. A laminate made of 100% cotton linter paper yielded the same post-formability with only slight advantages in laminate thickness.

All the papers described so far were decorative absorbent papers, which result, in combination with the resin, in an opaque top surface layer on the laminate. Surfacing any of the regular decor or post-formable decor papers according to this invention with a transparentizing (resin containing) overlay paper of a type presently used in commerce (to protect the decorative printed surface and to increase the abrasion resistance of the surface with a transparent layer) results in severe loss of post-formability of the laminates. All the basic concepts outlined above for the manufacture of post-formable decor papers apply also to the manufacture of post-formable overlay papers.

Using 35–100% long-fibered cotton linters in combination with 0–65% wood pulp fibers, overlay paper which yield post-formable laminates of good post-formable properties have been developed. For optimum post-formability, such papers should be used in combination with post-formable decor papers. They do not yield laminates of optimized post-formability with regular non-post-formable decor papers, but they improve the post-formability of such standard laminates to a limited degree.

Post-formable overlay papers of 35–100% long-fibered cotton linters of 28, 16, 14 and 10 lb. basis weight (24 x 36-500) were prepared and improved post-formability was obtained if two resin-treated (70% resin content) layers of a 10 or 14 lb. (24 x 36-500) basis weight were used instead of one layer of 20 or 28 lb. basis weight paper of the same resin content. This is a novel effect and wholly unexpected. Likewise, overlay paper can also be manufactured in a double layer structure in order to decrease the over-all amount of the more expensive cotton fibers required. Such a paper has a surface layer relatively rich in cotton fibers and a base layer containing relatively few or no cotton fibers.

The following examples are presented as illustrative of the invention, but are not intended to be limiting.

Example 1

10 kg. of cotton linters were beaten at 3% stock consistency with beater and jordan to a freeness of 565 ml. (Canadian Standard) and the following Clark Classifier tests were obtained:

|  | A |
| --- | --- |
| 14 mesh | 12–25 |
| 30 mesh | 32–36 |

20 ml. ammonia (27% solution), 35 grams guar gum, 2.5 kg. titanium dioxide, 0.8 kg. diatomaceous earth and 0.1 kg. zinc oxide were added to the stock, which had a pH of 8.8, was mixed under good brushing action. The stock was diluted to 1.5% stock consistency and 1000 ml. alum (6% solution) was added to a pH of 7.3. The stock was diluted further to 2–5 gr./l. with white water from the paper machine and fresh water and the pH of this stock was 7.2 after the final dilution. 40 grams of melamine-formaldehyde resin as a 0.03% solution was added continuously to the headbox of the pilot plant paper machine for fluocculation and to wet strengthen the paper, at a rate to give 0.2% resin in the paper. The paper was formed by feeding the slurry to the wire of a conventional horizontal fourdrinier, dewatering, drying and calendering the paper web.

The absorbent paper so formed contained approximately 74% cotton linter fibers, 18.5% $TiO_2$, 6% diatomaceous earth, 0.75% ZnO and approximately 0.2% melamine-formaldehyde wet strength resin. The paper obtained had the following properties.

| | |
| --- | --- |
| Basis weight (24 x 36-500) lb. | 100 |
| Thickness (mils): | |
| Uncalendered | 13 |
| Calendered | 9 |
| Wet tensile, gm./in. | 600–750 |
| Mullen, p.s.i. | 15–18 |
| Dry tensile, gm./in. | 6000–9500 |
| Oil penetration, sec. | 3–4.4 |
| Tear, grams | 120–140 |
| Absorbency, 1/16 inch | 40 |
| Ash, percent | 23 |
| Porosity, sec. | 400 |
| pH of water extract | 7.2–7.6 |
| Alkali No. (ml. 0.01 N HCl) | 2–3 |
| Opacity (TAPPI), percent | 98 |

The absorbent paper was impregnated with a 50% melamine formaldehyde resin solution adding 50% resin to the paper. The volatile content of the paper was adjusted to 3–5% and the resin flow to 1–6%. The impregnated absorbent paper was then incorporated into a decorative laminate by placing the absorbent paper, felt side up, upon a plurality of plies of corestock impregnated with a phenol-formaldehyde resin at 30% resin content. The laminates were pressed at 280° F. and 1000 p.s.i. for 15 minutes. Laminates of approximately 50 and 60 mil thickness were made by this method. The flat surface of the laminate showed good color and brightness. These laminates were then evaluated for post-formability under the following conditions:

(a) Bend temperature—313°–325° F.
(b) Bend radius—⅛, ¼, ⅜, ½, ⅝, ¾, ⅞ and 1"
(c) Degree of bend—60, 90 and 120 degrees
(d) Direction of bend: machine direction and across machine direction For comparison purposes, regular decorative decor papers made of 100% wood pulp were used to make laminates in the same way and these were tested in the same manner as the laminates of this example.

In testing post-formability a simple jig with interchangeable wedge-shaped blocks is used. This jig comprises a base member having an angular notch therein, to which is hingedly connected a lever arm carrying a wedge-shaped block which is so located as to engage the notch in the base member. To use the jig, the heated sample of plastic laminate is placed on the base member so as to overlie the notch. The lever arm is then lowered, whereby the wedge block forces the laminate into the notch. The various wedge-shaped blocks have their tips rounded to different radii, ranging from ⅛" to 1" as indicated above. Likewise, different wedge angles are provided by the various blocks, so that bends can be made ranging from 60 degrees to 120 degrees.

After post-forming laminate samples in the jig, the surface of the laminate is rubbed with a wax-carbon crayon to show up crazing and cracks in the area of the bend. After examination of the post-formed sample, it is graded subjectively by reference to a set of 20 prior graded samples selected to show post-formability ranging from complete failure to complete post-formability, the latter being completely free of any evidence of cracking or crazing in the area of the bend. On this scale, complete failure (the sample cracks or breaks apart) is rated 1, while a sample which post-forms without any evidence of cracks or crazing is rated 20. Intermediate rating numbers are assigned to samples falling between these extremes.

Most regular decor papers usually result in post-formability ratings of 1 to 10, while papers according to this invention, give ratings of 18–20. Any rating of 18–20 for a given bend is regarded as acceptable. In the following, OK means surfaces with ratings of 19 or 20, which means substantially no blemishes or crazes were evident.

The decor paper of Example 1 gave excellent post-formability under nearly all laminate manufacturing conditions outlined. 50 mil laminates post-formed well for bends of ⅛ in. radius with no crazing. The test results for 60 mil laminates made with regular corestock (bend temperature 313° F.) are shown below. Needless to say, these are severe testing conditions.

| Bend Radius, in | ¼ | ⅜ | ½ | ⅝ | ¾ | ⅞ |
|---|---|---|---|---|---|---|
| Laminates Made With Standard Decor | Failure | Failure | Failure | Failure | Failure | Failure |
| Laminates Made With Post-Formable Decor According to Example 1. | (OK) slight crazing). | OK | OK | OK | OK | OK |

With optimized flow (1–2%) and volatile (2%) content of the resin treated post-formable decor paper, blemish free ¼ in. 120 degree bends for 60 mil laminates are obtained. Some laminates post-formed well at laminate thicknesses as high as 68 mils, using the decor paper of this example, while laminates made of regular corestock, using special post-formable resins and two layers of X-creped corestock but with conventional decor paper failed at 55 mil thickness on a ⅝ inch radius bend.

*Example 2*

A paper was made according to Example 1 but instead of the 100% cotton linter fiber furnish, 45% cotton linters of a beating degree of 21 degrees Schopper and a Clark Classifier 14 mesh screen retention of 21% were combined with 55% of a cellulosic alpha pulp of 24 degrees Schopper and of 11% retention on the 14 mesh screen of the Clark Classifier.

Laminates of 47 mil and 60 mil thickness were prepared and tested in the way described in Example 1. The results are summarized below:

47 MIL LAMINATE USING REGULAR CORESTOCK
Bend Angle—90 degrees

| Bend Radius | ¼ in | ½ in | ⅝ in | ¾ in | ⅞ in |
|---|---|---|---|---|---|
| Regular Decor Paper | Failed | Failed | Failed | Failed, Edge Cracking. | OK (Few Crazes). |
| Decor Paper According to Example 2. | Crazing | OK (Some Slight Crazing). | OK | OK | OK. |

60 MIL LAMINATE USING REGULAR CORESTOCK
Bend Angle—90 degrees

| Bend Radius | ⅜ in | ⅝ in | ¾ in | ⅞ in | 1 in. |
|---|---|---|---|---|---|
| Regular Decor Paper | Failed. Cracks | Failed. Cracks | Failed. Cracks | Failed. Cracks | Failed. Edge Cracks. |
| Decor Paper According to Example 2. | No Cracks, But Crazing. | OK, Borderline Some Crazing. | OK, Very Slight Craze. | OK | OK. |

The 60 mil laminates made with regular decor could not be post-formed at even a 1″ radius bend, while the decor paper made according to Example 2 could be post-formed at a ⅝″ bend with a rating of 17–18 with very little crazing. The regular decor also had edge cracks and was completely unacceptable.

*Example 3*

A long-fibered absorbent paper of 50% cotton linters and 50% long-fibered bleached kraft was formed with the uphill wire paper machine at a stock consistency of 0.5 gr./l. with pulps beaten at pH 8.4. The following results were obtained on the Clark Classifier:

|  | Cotton Linters | Kraft |
|---|---|---|
| Clark Classifier Screen: |  |  |
| 14 Mesh, Percent | 26 | 54.4 |
| 30 Mesh, Percent | 24 | 8.5 |
| Freeness CF | 625 | 660 |

Opacifying fillers were added to the wet web at the wet end of the paper machine in amounts of 24.5% based on the final paper weight, using the following filler slurry composition:

|  | Percent |
|---|---|
| Titanium dioxide | 80.4 |
| Calcium carbonate | 13.5 |
| Starch | 5 |
| Sodium hexametaphosphate | 0.1 |
| Urea-formaldehyde wet strength resin | 1 |

The final paper so prepared had the properties listed below.

|  | Uncoated Paper | Coated Paper |
|---|---|---|
| Basis Weight (24 x 36-500) lb | 79 | 100 |
| Thickness, mils | 9.0 | 10.5 |
| Tensile, gm./in | 8,400 | 10,000 |
| Mullen, p.s.i. | 21.0 | 36 |
| Tear, gm | 130/120 | 200/200 |
| Oil penetration, sec | 5.0 | 8.0 |
| Opacity (TAPPI) Percent |  | 98.5 |
| pH of Water Extract |  | 7.4 |

After resin saturation, the paper was used to form a post-formable laminate using the following assembly:

One sheet: decor treated to 50% melamine-formaldehyde resin content according to Example 1.
Three sheets: regular corestock.
Two sheets: creped corestock.

Initial pressing was at 1400 p.s.i. at 276° F. for 20 minutes. The laminate post-formed well at ¼, ⅜, ½, ⅝ radii at 90 degree angle of bend.

*Example 4*

A post-formable double-lay decorative absorbent paper was formed with the help of an uphill wire Fourdrinier paper machine with a secondary headbox as follows:

Primary furnish:

|  | Percent |
|---|---|
| Bleached sulfate (650 CF, 50% 14 mesh screen) | 15 |
| Bleached hardwood soda, 600 CF | 20 |
| Bleached sulphite (600 CF, 27% 14 mesh screen) | 35 |
| Titanium dioxide | 25 |
| Diatomaceous earth | 4 |
| Zinc oxide | 1 |

Other additives were: 0.3% guar gum, 0.2% melamine-aldehyde resin, ammonia to produce a pH of 8.8, alum to reduce pH to 7.2. 60 lb. (24 x 36-500) primary paper layer (layer next to corestock) formed on the uphill wire Fourdrinier paper machine.

Secondary furnish:

| | Percent |
|---|---|
| Cotton linters, (725 CF, 24% 14 mesh) | 80 |
| Titanium dioxide | 16 |
| Diatomaceous earth | 4 |
| Zinc oxide | 1 |

Other additives were: 0.3% guar gum, 0.2% melamine-formaldehyde resin, ammonia to increase pH to 8.8, alum to reduce pH to 7.2. 40 lb. (24 x 36-500) secondary paper layer (decorative layer), added to the primary layer by means of a secondary headbox.

The finished paper had the following composition:

| | Percent |
|---|---|
| Cotton linters | 32 |
| Bleached sulfate | 9 |
| Bleached sulfite | 20 |
| Bleached hardwood soda | 12 |
| Titanium dioxide | 15 |
| Titanium dioxide, special lightfast | 6.5 |
| Diatomaceous earth | 4.0 |
| Zinc oxide | 1 |
| Melamine-formaldehyde resin | 0.2 |
| Guar gum | 0.3 |

The top layer consisted of long-fibered cotton linters and a special and relatively expensive lightfast grade of titanium dioxide, while the bulk of the paper was composed of relatively inexpensive fibers and titanium dioxide filler for opacity. The overall composition costs approximately the same as regular non-post-formable one layer decor paper formulations. The double-layer paper had the following paper properties:

| | |
|---|---|
| Basis weight (24 x 36-500), lb. | 110 |
| Thickness, mils | 11 |
| Dry tensile, gr./in. | 7500 |
| Wet tensile, gr./in. | 800 |
| Mullen, p.s.i. | 15 |
| Tear, gr. | 130 |
| Oil penetration, sec. | 3 |
| pH of water extract | 7.6 |
| Alkali number, (0.01 N HCl), ml | 2.0 |

50 mil post-formable laminates were prepared as outlined in Examples 1 and 3. Good post-formability was observed for ¼ in. bend, with 120 degree bend angle.

These results are unexpected and outstanding in view of the fact that the paper composition required only 32% of the expensive cotton linter fibers, which costs were offset by saving in the less expensive opacifying fillers and the other fiber materials used in the construction.

*Example 5*

9000 grams of a long-fibered cellulosic pulp, consisting of 50% cotton linters and 50% alpha cellulose bleached sulfate fibers of 600-650 CF and 70% total retention on the 14 and 30 mesh screens of the Clark Classifier was mixed with 1000 grams of 3 denier nylon fibers, 250 grams titanium dioxide, 100 grams zinc oxide using the same method of paper manufacture described in Example 1. This paper consists of 36% cotton linters, 36% wood cellulose fibers, 8% nylon fibers, 20% titanium dioxide and 0.78% zinc oxide.

This paper had the following properties:

| | |
|---|---|
| Basis weight (24 x 36-500), lb. | 92 |
| Thickness, mil | 8.5 |
| Dry tensile, gr./in.: | |
| MD | 8600 |
| CD | 3800 |
| Tear, grams | 100–129 |
| Water absorbency, 1/32 in. | 20 |
| Mullen, p.s.i. | 11.5 |
| Wet tensile, gr./in. | 800 |
| Densometer sec. for 400 ml. | 38 |

This paper was treated with melamine-formaldehyde resin to a resin content of 50% and precured to a volatile content of 2–6% and a flow of 4–8%.

This paper is able to form laminates capable of forming more complex curves, and has noticeably good deep draw characteristics.

*Example 6*

A post-formable overlay paper was prepared as follows:
5 kg. cotton linters are beaten to a beating degree of 450 CF, with a Clark Classifier test as follows:

| | Percent |
|---|---|
| 14 mesh | 29.5 |
| 30 mesh | 30 |

To this pulp was added 5 kg. special filter pulp, a chemical grade of cotton linter pulp produced by Hercules Powder Co., specially cooked with alkali and marketed as SFP. The two stocks were beaten together until the final furnish had a Canadian Standard freeness of 600 and the following Clark Classifier screen retention:

| | Percent |
|---|---|
| 14 mesh | 19.5 |
| 30 mesh | 31.5 |

The beating was carried out at a pH of 8.2 to 8.8 (ammonia). The stock was diluted to 1–2% stock consistency and alum was added to a pH of 7.2. Following this, 2% calcium silicate was added as an acid acceptor. 0.4% polyamide wet strength resin (Amres 8853) and 0.05% vinyl silane (Union Carbide A–1100) were added to the formed paper on the Fourdrinier wire by spray application. The paper consists of 50% cotton linters, 50% chemically treated mercerized cotton linters and 0.2% polyamide curing wet strength resin. The sheet is formed at 0.5 gr./l. stock consistency on the wire of an uphill wire paper machine.

The paper had the following properties.

| | |
|---|---|
| Basis weight (24 x 36-500), lb | 28 |
| Thickness, mil | 4.6 |
| Water absorbency, 1/16 t.h.s. | 40 |
| Dry tensile: | |
| MD gm./in. | 2750 |
| CD | 2050 |
| Mullen, p.s.i. | 5.5 |
| Tear, grams | 45 |
| Wet tensile, gr./in. | 400 |
| pH of water extract | 7.2 |
| Alkali No. (ml. 0.01 N HCl) | 1.7 |

This paper was impregnated with a 50% melamine-formaldehyde resin solution, adding 68–70% resin to the paper. The volatile content of the paper was adjusted to 3–5% and the resin flow to 6–15%. This resin-treated post-formable overlay paper and decorative post-formable decor paper from Example 1 were placed on a plurality of plies of corestock impregnated with a phenol-formaldehyde resin as described in Example 1. The laminates were pressed at 278° F. at 1000 p.s.i. for 15 minutes. Laminates of 50 and 60 mil thickness were made by changing the number of plies of the impregnated corestock.

These laminates were then evaluated for post-formability under the conditions described in Examples 1–4.

The post-formability tests are rated good for CD and MD for ⅛, ¼ and ⅜" and higher bend radii. The same paper used over regular decor without the post-formable characteristics described in this invention did not post-form acceptably for ⅛", ¼", ⅝" and ½" radius bends.

Regular overlays made of short fibered viscose rayon and/or alpha cellulose pulps, as used now in the trade, also showed negative post-formability up to ¾" to 1" radius bends if used in combination with regular decor or even with post-formable decor according to the Example 1. Post-formable overlay paper of the nature described in Example 5 and the following examples yields acceptable post-formability characteristics when used in combination with the post-formable decor paper, and the use of regular overlay paper with post-formable decor, or post-formable overlay with regular decor leads to inferior results.

*Example 7*

Cotton linter pulp and wood pulps were beaten to the Clark Classifier specifications shown below:

|  | Cotton Linters | Bleached Kraft |
|---|---|---|
| 14 mesh | 25.5 | 56 |
| 30 mesh | 33.5 | 28 |
| 50 mesh | 20.5 | 8 |
| Freeness (Canadian) | 715 | 550 |

50% of the cotton linter pulp and 50% of the wood pulp were lightly beaten together at pH 8.8 (ammonia) for 20 minutes and alum added to adjust the pH to 7.1. 1% of alkali curing wet strength resin (Amres 8853) was added in the beater. The stock was diluted to 0.3 gr./l. and overlay papers of 10, 14 and 16 lb. basis weight (24 x 36-500) were formed on an uphill wire paper machine.

The papers had the following properties.

| | | | |
|---|---|---|---|
| Basis Weight (24 x 36-500), lb | 10.5 | 14 | 16.5 |
| Thickness, mils | 3.3 | 4.2 | 4 |
| Dry Tensile, gr./in | 1,300 | 1,800 | 2,200 |
| Wet Tensile, gr./in | 400 | 400 | 500 |
| Mullen, p.s.i | 4.0 | 5.0 | 5.0 |
| Tear, gr | 24 | 20 | 26 |
| Resin Penetration, sec | (¹) | (¹) | (¹) |
| Water Absorbency, 1/16 in | 40 | 40 | 42 |
| pH of Water Extract | 7.4 | 7.3 | 7.6 |
| Alkali No. (ml. 0.01 N HCl) | 1.0 | 1.0 | 1.5 |

¹ Instant.

The papers were next treated with melamine-formaldehyde resin to a resin content of 70% and laminates were formed as described in the previous examples. Laminates having either 1 or 2 layers of the 10 and 14 lb. overlay paper were used on the surface of each laminate. With two layers of the 10 and 14 lb. overlay paper, excellent post-forming of 60 mil laminates down to ⅛" and ¼" bend radius and 90–120 degrees bend angle were obtained. With one layer of overlay paper, post-formability was limited to ⅝" bend radius at 60 degrees bend angle. Regular overlay of 30 lb. basis weight, in the same series of tests, shows heavy crazing and is not useable at ⅝" radius and 60 degree bend angle, or ½" and ¾" bend radius at a 90 degree bend angle.

The foregoing examples have been presented for the purpose of illustration only, and it is to be understood that the present invention includes all modifications and equivalents which fall within the scope of the invention as defined by the following claims.

What is claimed is:

1. A post-formable absorbent paper adaptable to use in preparing post-formable plastic laminates comprising in combination:
   (a) a fiber portion containing from 35 to 100% of fine fibers selected from vegetable fibers and synthetic organic fibers, said fine fibers being characterized by having a specific volume of 75 to 175 cubic microns per unit length and an average length of greater than 2 mm.,
   (b) the remainder of the said fiber portion being selected from paper making wood pulps,
   (c) from 0.5 to 3.0%, based on the total weight of said fiber portion, of an acid acceptor selected from zinc oxide, calcium carbonate and calcium silicate, said paper being essentially neutral, as measured by the pH of its water extract ranging from 6.8 to 7.6 with the alkali number of the water extract ranging from 0.5 to 3.0.

2. A post-formable absorbent paper adaptable to use in preparing post-formable plastic laminates comprising in combination:
   (a) a fiber portion containing from 35 to 100% of fine fibers selected from vegetable fibers and synthetic organic fibers, said fine fibers being characterized by having a specific volume of 75 to 175 cubic microns per unit length and an average length of greater than 2 mm.,
   (b) the remainder of the said fiber portion being selected from paper making wood pulps,
   (c) from 0.5 to 3.0%, based on the total weight of said fiber portion, of an acid acceptor selected from zinc oxide, calcium carbonate and calcium silicate,
   (d) from 12 to 33% of opacifying mineral filler, based on the total weight of said paper,
said paper being essentially neutral, as measured by the pH of its water extract ranging from 6.8 to 7.6 with the alkali number of the water extract ranging from 0.5 to 3.0.

3. The paper of claim 1 wherein the acid acceptor is zinc oxide.

4. The paper of claim 1 wherein the acid acceptor is calcium carbonate.

5. The paper of claim 1 wherein the acid acceptor is calcium silicate.

6. The paper of claim 1 wherein the fine fibers are cotton linters.

7. The paper of claim 1 wherein the fine fibers are synthetic organic fibers.

8. The paper of claim 7 wherein the synthetic organic fibers are nylon fibers.

9. The paper of claim 7 wherein the synthetic organic fibers are acrylic fibers.

10. A double layer post-formable absorbent paper adaptable to use in preparing post-formable plastic laminates comprising in combination:
    (a) a top surface layer having a fiber portion consisting essentially of fine fibers selected from vegetable fibers and synthetic organic fibers, said fine fibers being characterized by having a specific volume of 75 to 175 cubic microns per unit length and an average length greater than 2 mm.,
    (b) a base layer of wood pulp fibers, and
    (c) from 0.5 to 3.0%, based on total fiber weight of the combined top and base layers of zinc oxide, said double layer paper being essentially neutral, as measured by the pH of its water extract ranging from 6.8 to 7.6 with the alkali number of the water extract ranging from 0.5 to 3.0.

11. The double layer paper of claim 10 wherein the top layer comprises 20 to 50% of the total weight of the paper and the base layer comprises 80 to 50% of the total weight of the paper.

12. The double layer paper of claim 10 wherein both the top and base layers contain opacifying fillers.

13. The double layer paper of claim 10 wherein the top layer contains light-fast opacifying mineral fillers.

References Cited

UNITED STATES PATENTS

| 2,816,851 | 12/1957 | Arledter | 162—146 |
| 2,962,415 | 11/1960 | Arledter | 162—149 |
| 3,019,155 | 1/1962 | Snyder | 162—149 |
| 2,801,198 | 7/1957 | Morris et al. | 161—246 |

S. LEON BASHORE, *Primary Examiner.*